No. 611,728.  
A. H. BURR.  
INCUBATOR.  
(Application filed Mar. 27, 1896.)  
Patented Oct. 4, 1898.

(No Model.)

WITNESSES:  
G. W. Paddock  
W. E. Banker

INVENTOR  
Archer H. Burr  
BY  
ATTORNEY.

THE NORRIS PETERS CO., PHOTO-LITHO., WASHINGTON, D. C.

UNITED STATES PATENT OFFICE.

ARCHER H. BURR, OF OMAHA, NEBRASKA.

INCUBATOR.

SPECIFICATION forming part of Letters Patent No. 611,728, dated October 4, 1898.

Application filed March 27, 1896. Serial No. 585,138. (No model.)

*To all whom it may concern:*

Be it known that I, ARCHER H. BURR, residing at Omaha, in the county of Douglas and State of Nebraska, have invented certain useful Improvements in Incubators; and I do hereby declare that the following is a full, clear, and exact description of the invention, such as will enable others skilled in the art to which it appertains to make and use the same, reference being had to the accompanying drawings, which form a part of this specification.

This invention has relation to a new and novel improvement in incubators.

The object of my invention is to provide an incubator that shall be noticeable because of its extreme simplicity.

I have further embodied a self-regulating heating device, as will be described more fully hereinafter.

Figure 1:
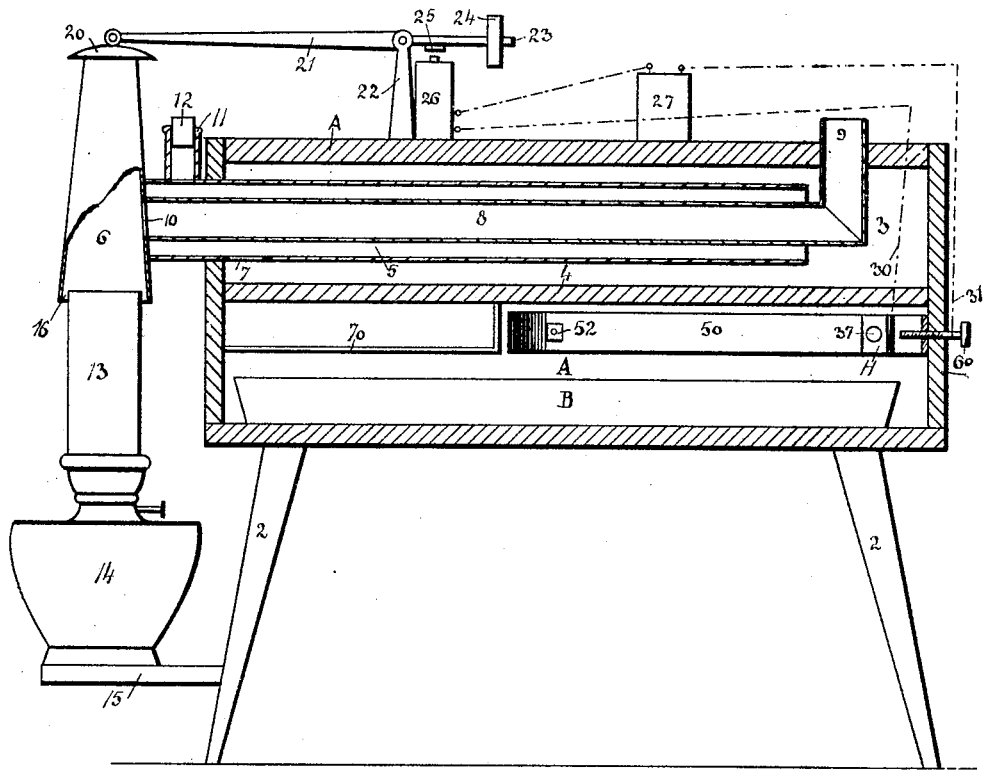
Figure 2:
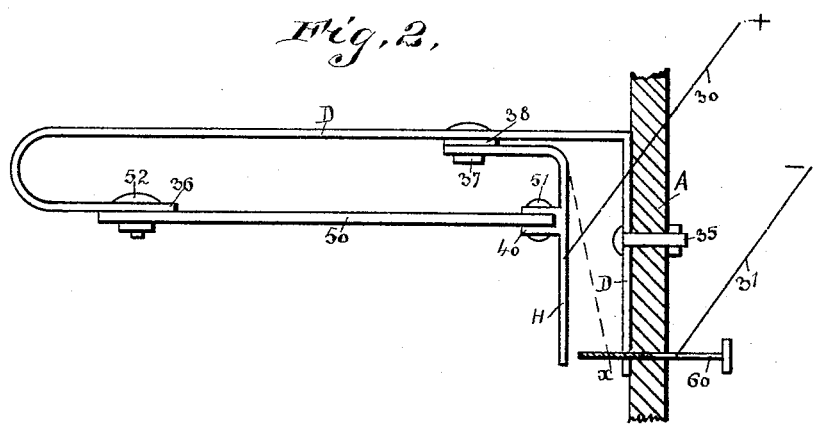

In the accompanying drawings, Figure 1 shows the central sectional view of an incubator embodying my invention, with parts broken away, while Fig. 2 shows an enlarged detached top view of the heat-regulator as used in my invention.

My invention embodies, essentially, a suitable rectangular casing A, provided with the supports 2. This casing is provided at a suitable point with a hinged door, permitting a ready insertion of the egg-tray $b$, which tray may be of any size or conformation. The casing A is preferably divided into an upper water-chamber 3 by means of the dividing-wall 4, as shown. The casing A may be of any size and material. Entering the water-chamber 3 at a suitable point is a tube or duct 5, which projects at one end beyond the casing and is secured to the hood 6, the end within the casing being open near the exit-point of this tube 5 is provided with an opening 7, as illustrated. Positioned centrally within this duct 5 is a heat-flue 8, the end 9 of which is made to project beyond the casing A. As disclosed, this pipe has both of its ends projecting beyond the casing, the remaining end also being secured to the hood 6, from which is permitted an entry into this heat-flue through the opening 10. The water-chamber 3 is filled by means of the stub-tube 11, closed by means of an ordinary stopper 12. To fill the water-chamber 3, the stopper 12 is removed, when the water will enter the chamber through the pipe 5. The hood 6 has an open-ended, preferably conical, sheet-metal device which acts as a chimney in conjunction with the tube 13, having the lower portion of the chimney for a lamp 14, which is held by means of a support 15, secured to one of the supports 2. The tube 13 is preferably cylindrical, and much smaller than the hood 6 at the point of entry, so as to permit an air-space 16, as shown.

In my drawings I have shown an ordinary lamp 14 as providing the necessary heat to raise the temperature within the water-chamber 3.

Now it is well understood by all those familiar with the handling of an incubator that it is of vital importance that the heat be not raised above a certain degree. In order to nicely control the heat within the incubator, I provide the hood 6 with a removable top 20, which top is secured to a lever 21, pivoted to the post 22, the lever being further provided with a projection 23, upon which is held a counterpoise 24, as shown in the drawings. This projection 23 is further provided with a soft-iron bar 25, positioned immediately above an ordinary electromagnet 26, which is properly connected to a battery 27 in circuit with the terminals 30 and 31. Positioned within the incubator proper is my heat-regulator, comprising the J-shaped metal bar D, forming a bracket, as shown in Fig. 1, which bar is secured to the side of the casing A by means of the bolt 35 and which has its front end recurved, as is shown. Secured near the angular end of the bar D is a second rectangular spring-bar H, of metal, secured to the bar D by means of the bolt 37, the bars $d$ and $h$ being insulated by means of a suitable non-conductor 38. Normally the spring-bar $h$ or arm exerts a tension away from the curved end of the bracket, as indicated by dotted lines in Fig. 2; the shorter stem 40 of this bar being bifurcated and being adapted to receive the preferably rubber bar 50, secured to this bifurcation 40 by means of the bolt 51 and to the recurved end 36 by means of the bolt 52, passing through the housing and the bar D. At a suitable point is a set-screw 60, which set-screw is adapted to receive the wire 31, while the rectangular spring-bar H is adapted to receive the wire 30, as is shown in Fig. 2.

To fully equip my incubator, I provide a small shelving 70 within the incubator, adapted to receive a suitable vessel of water to prevent the chamber from becoming too dry, when all the instrumentality and operation of my device would be as follows: The water-tank having been filled and the lamp having been lighted to heat the water-tank, now the heat in escaping from the tube 13 would enter the hood 6, which, however, would be closed above by means of the cap 20, so that the heat would be compelled to pass through the flue 8 to heat the water surrounding this flue. Before escaping at the point 9 the heat in entering the hood 6 would be supplied with the proper amount of fresh air, permitted to enter through the space 16. Now as the water surrounding the tube 8 became heated it would find an outlet at the open end of the tube 5, and as the heated water passed out the end the cooler water would be permitted to enter through the opening 7, so as to create a circulation within this tube 5. In my drawings I have shown the flue 8 as passing centrally through the water-chamber, though it is of course understood that the same could be recurved several times before being permitted to extend beyond the chamber. Now as the heat rises within the chamber it would gradually expand the metal bar D, as well as the rubber 50, which expansion would be aided by means of the spring angular bar H, which bar would prevent the rubber 50 from buckling. As this expansion increased it would at a certain point, which point would be regulated by means of the screw 60, cause a contact between this screw and the bar H to close the electric circuit, so that the magnet 26 would operate lever 21 to raise the removable cap 20, so that the heat would of necessity be permitted to escape through the flue 8 and would find a direct outlet at the upper end of the hood 6. This would of course check the further rise of temperature in preventing the inflow of heat.

Referring to the drawings, it will be noticed that the upper end 9 of the flue 8 terminates at a height below that of the upper end of the hood 6, which has a considerable importance in that as soon as the cap 20 is removed the supply of heat is not only checked as to the flue 8, but the upward draft within the hood 6 causes an inrush of cold air at the open end 9, which inrush finds an escape out of the upper end of the hood 6, so that the heat is not only checked, but a current of cold air is brought into the heat-flue, which instantly reacts to reduce the temperature. As soon as the temperture had been reduced within the incubator proper the bars d and 50 would again contract to break the contact, when the connection would be broken to immediately drop the cap 20, when the heat would again be directed through the flue 8.

The various parts are simple of construction, accessible, and readily operated.

Having thus described my said invention, what I claim as new, and desire to secure by United States Letters Patent, is—

1. The combination with a water-heating chamber, of a vertical open-ended flue upon the outside of said chamber, the open end of said flue extending above said chamber, a lateral flue extending from said vertical flue through said chamber and then upward and terminating a suitable distance below said vertical flue, a pipe extending from said vertical flue and surrounding said lateral flue a suitable distance, said pipe being open at one end and being provided with a vent-opening near the closed end to cause a water circulation, a cap to close said open-ended flue, a pivoted lever supporting said cap and a circuit making and breaking thermostat controlling the opening and closing of said cap, said lateral flue being made to terminate below the upper edge of said vertical flue to permit a cooling draft to pass through said flue, all arranged and adapted to operate substantially as and for the purpose set forth.

2. The combination with a heating-chamber, of a superposed water-tank, a flue extending into said tank, and then passing upward and outward, a heater in connection with said flue, terminating a suitable distance above the termination of said flue, a sleeve surrounding said flue provided with an opening and extending from said heater, a valve within the upper end of said heater, and means to automatically open and close said valve.

3. A thermostat comprising a J-shaped metallic bracket, a spring-arm extending laterally from the upper termination of said bracket, and exerting a tension away from the curved stem of said bracket, and a bar of rubber or like material secured to the curved end of said bracket and to said spring-arm, so that said bar is normally held under spring tension, as and for the purpose set forth.

4. The combination with a heating-chamber, of a superposed water-tank, a flue extending into said tank and then passing upward and outward, a heater in connection with said flue, terminating a suitable distance above the termination of said flue, said heater being external to said casing and superposed water-tank, a sleeve surrounding said flue and extending from said heater, there being an opening within said sleeve, a valve within the upper end of said heater, a counterbalanced pivoted bar secured to said valve to operate the same, an electromagnet below said counterbalanced bar, a circuit-making thermostat within said heating-chamber, wire connections forming a circuit between said thermostat and electromagnet, and a battery within said wire circuit, all arranged substantially as and for the purpose set forth.

In testimony whereof I affix my signature in presence of two witnesses.

ARCHER H. BURR.

Witnesses:
DEXTER L. THOMAS,
C. L. THOMAS.